Patented Apr. 17, 1934

1,955,235

UNITED STATES PATENT OFFICE 1,955,235

PROCESS OF PREPARING UNGREENABLE ANILINE BLACK

August Holtmann and Moritz Freiberger, Charlottenburg, Berlin, Germany

No Drawing. Application February 17, 1931, Serial No. 516,500. In Germany February 24, 1930

8 Claims. (Cl. 8—6)

This invention relates to processes of preparing ungreenable aniline black dyes.

The methods known prior to the present invention of producing dyes of the above character are unsatisfactory because of the fact that in use uniform results cannot be consistently obtained, and further the dyestuff attacks the fibers causing them to be less durable and lasting.

We have now discovered a method of preparing these dyes which overcomes the above defects comprising, broadly, in adding an organic heterocyclic nitrogen compound to the aniline black baths or printing paste compositions now known. The constituents of the baths and compositions now in use vary considerably, but all are composed essentially of amines, such as aniline and other aromatic amines, or aminophenols. The nature of the aniline black bath or composition to which the heterocyclic compound is added appears non-essential to the success of the final product.

The term, organic heterocyclic nitrogen compounds, describes and includes cyclic compounds in which a nitrogen atom is joined in the ring of carbon atoms. The bases themselves as well as derivatives thereof have been found satisfactory and as examples, pyridine, the chinolines and the acridines, and their homologues and derivatives may be stated. Especially satisfactory results can be obtained by the use of chinoline or a derivative thereof in the form of a water soluble salt. Whether the water insoluble base or the soluble salt is employed, each should be dispersed into a fine state of sub-division in the bath. It has been found that the bases of the above nature, though insoluble, can be dispersed or distributed without difficulty throughout the aniline black baths or printing compositions, and sufficiently durable emulsions can be thereby obtained. If desired, the dispersion may be expedited by the addition of alcohols or phenols.

It is believed that the molecules of the heterocyclic nitrogen compound unite with the aniline black molecules by condensation, aided or effected through oxidation. The belief that the molecules are thus enlarged is concluded from the fact that it has been observed that the larger the molecules of the heterocyclic compound added, the better the results obtained.

To still further diminish any ill effects which may result to the fibers when the aniline black is put in use, an oxidizable nitrogenous compound may be added to the aniline black bath or printing color composition in addition to the heterocyclic compound. Such compounds serve to regulate the oxidation process, and may be cyclic or aliphatic nitrogenous compounds of the nature of hydroxylamine, hydrazines, or nitriles or the like. It is thought that the molecules of these compounds also enlarge the molecules of the aniline black dyestuff.

A second class of oxidizable nitrogenous substances which diminish the detrimental effect on the fibers but which are believed not to enlarge the molecules of the aniline black include the decomposition products of certain proteins such as gluten and albuminous substances obtained by the treatment of gluten and albuminous substances with acids or alkalies. Methods of producing the decomposition products are well known. For example, a substance such as albumen, casein, gluten or the like is cooked with soda liquor, after which the liquid is filtered and neutralized in the usual manner.

The nitrogenous substances are added in a quantity sufficient only to combine with the excess oxygen evolved and also with any acid set free, such as hydrochloric acid. An excess of the nitrogenous substance is to be avoided because such will prevent the oxidation of the aniline black into the ungreenable black.

Example 1

To each kg. of a known aniline black bath composed of aniline chlorhydrate, sodium chlorate and copper sulfate add 4 gs. of lutidine and agitate to thoroughly disperse the latter throughout the bath.

Example 2

To each kg. of a known aniline black paste composed of aniline chlorhydrate, sodium chlorate, potassium ferrocyanide add and mix 4 gs. of chinoline chlorhydrate and 4 gs. phenylhydrazine.

Example 3

To each kg. of the product produced in Example 2, add a portion of decomposed gluten or albuminous substance in a suitable dilute solution, the quantity employed being that amount which can be produced by decomposition of from 1 to 5 gs. of the dry raw material.

Example 4

To an aniline black bath or printing paste containing the usual constituents, add 0.3% of chinoline, 0.3% phenylhydrazine, 0.3% of a salt of phenylene diamine and 0.3% of the decomposition products estimated on the raw material, as above described.

The aniline black baths and printing pastes produced according to the present invention are exceedingly valuable, because the fabric or goods after treatment therewith needs only to be washed to complete the dyeing process. The usual chrome treatment is unnecessary, for it improves neither the color of the dye nor its permanency.

It is particularly noteworthy that all shades of black obtainable by this process with sodium acetate reserve or resist will, without the use of zinc white or covering pigment, come out with the pure white color of the fibers retained. Thus there is formed at once the finished correct black without any by-products, with the result that the fibers are uniformly black. In addition to this property, the black is resistant against friction and is fast to soap. Accordingly, by the simple procedure of heating or steaming and washing without the use of chrome treatment, we obtain an aniline black which is ungreenable, and obtain dyed fibers which have not been weakened and can be maintained pure white by the use of resists. The dyeing process is simpler and can be carried out more rapidly than the usual aniline black dyeing processes. The dye of the present invention is an intense shiny black though no treatment with chrome salts is employed.

Herein and in the appended claims the term, aniline black dyestuffs, refers generically to known aniline black dye baths and aniline black printing paste compositions, it being understood that baths of this nature usually consist of colorless substances, the black being formed only on the fibers undergoing treatment by subsequent oxidation.

Having thus described the invention, what is claimed as new and desired to be secured by Letters Patent is:

1. The process of preparing ungreenable aniline black dyes and printing pastes comprising adding an organic heterocyclic nitrogen compound to aniline black dyestuffs.

2. The process of preparing ungreenable aniline black dyes and printing pastes comprising adding a salt of an organic heterocyclic nitrogen compound to aniline black dyestuffs.

3. The process according to claim 1 in which the heterocyclic compound is a derivative of chinoline.

4. The process according to claim 1 in which the heterocyclic compound is a salt of chinoline.

5. The process according to claim 1 in which the heterocyclic compound is an aqueous dispersion of a chinoline compound.

6. The process of preparing ungreenable aniline black dyes and printing pastes comprising adding an organic heterocyclic nitrogen compound and an oxidizable nitrogenous compound selected from the group consisting of hydroxylamines, hydrazines and nitriles to aniline black dyestuffs.

7. The process of preparing ungreenable aniline dyes and printing pastes comprising adding a chinoline compound to aniline black dyestuffs.

8. The process of preparing ungreenable aniline black dyes and printing pastes comprising adding an organic heterocyclic nitrogen compound and a hydrazine to aniline black dyestuffs.

AUGUST HOLTMANN.
MORITZ FREIBERGER.